(12) United States Patent
Zelano et al.

(10) Patent No.: US 9,657,864 B2
(45) Date of Patent: May 23, 2017

(54) HIGH PRESSURE VALVE

(71) Applicant: KENDRION (Villingen) GmbH, Villingen-Schwenningen (DE)

(72) Inventors: Frank Zelano, St. Georgen (DE); Holger Brandenburg, Villingen-Schwenningen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 127 days.

(21) Appl. No.: 14/157,396

(22) Filed: Jan. 16, 2014

(65) Prior Publication Data

US 2014/0217316 A1   Aug. 7, 2014

(30) Foreign Application Priority Data

Jan. 16, 2013  (DE) .......................... 10 2013 100 440

(51) Int. Cl.
| | |
|---|---|
| *F16K 31/06* | (2006.01) |
| *F02M 51/06* | (2006.01) |
| *F02M 63/00* | (2006.01) |
| *F02M 59/36* | (2006.01) |
| *F02M 59/46* | (2006.01) |

(52) U.S. Cl.
CPC ..... *F16K 31/0675* (2013.01); *F02M 51/0639* (2013.01); *F02M 59/368* (2013.01); *F02M 59/466* (2013.01); *F02M 63/0033* (2013.01); *F02M 63/0078* (2013.01); *F16K 31/0651* (2013.01); *F16K 31/0655* (2013.01); *F16K 31/0658* (2013.01)

(58) Field of Classification Search
CPC ............. F16K 31/0655; F16K 31/0651; F16K 31/0658

USPC .......................... 251/129.02, 129.16, 129.21
See application file for complete search history.

(56) References Cited

U.S. PATENT DOCUMENTS

| | | | | | |
|---|---|---|---|---|---|
| 4,531,708 | A | * | 7/1985 | Livet .............................. | 251/48 |
| 4,592,533 | A | * | 6/1986 | Guglielmi ............. | F16K 31/408 |
| | | | | | 251/129.15 |
| 4,763,635 | A | * | 8/1988 | Ballhause et al. ............ | 123/520 |

(Continued)

FOREIGN PATENT DOCUMENTS

| | | |
|---|---|---|
| DE | 37 41 526 A1 | 6/1989 |
| DE | 101 12 661 A1 | 9/2002 |

(Continued)

OTHER PUBLICATIONS

German Office Action for corresponding German Patent Application No. 10 2013 100 44 0.7 issued Sep. 16, 2013.

*Primary Examiner* — Matthew W Jellett
(74) *Attorney, Agent, or Firm* — Jonathan A. Kidney; TechLaw LLP

(57) ABSTRACT

Electromagnetically actuable high-pressure valve, having a valve seat which is arranged in a valve chamber and which can be closed off by a sealing element and which is arranged between a low-pressure side (N) and a high-pressure side (H) of the valve, wherein the sealing element is arranged so as to be movable between an open position and a closed position, having a movably arranged armature, and having an electrically energizable coil which is designed and arranged so as to be suitable for acting on the armature, wherein the armature and the sealing element are arranged in the valve chamber.

12 Claims, 4 Drawing Sheets

(56) References Cited

U.S. PATENT DOCUMENTS

Figure 1:
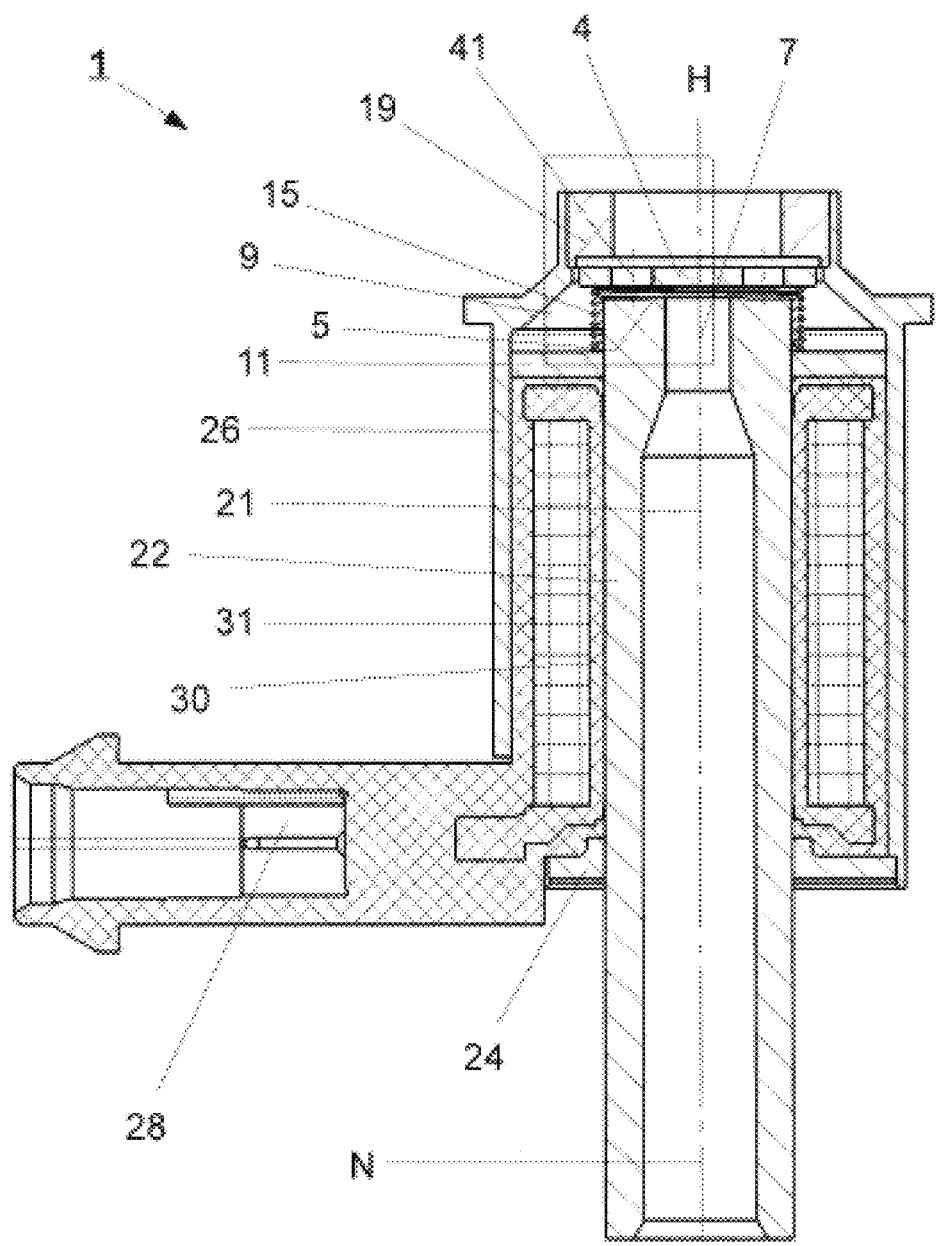

| | | | | |
|---|---|---|---|---|
| 5,054,691 A | * | 10/1991 | Huang | F02M 51/0639 |
| | | | | 239/585.3 |
| 5,374,029 A | * | 12/1994 | Bailey | 251/129.16 |
| 6,026,847 A | * | 2/2000 | Reinicke | F16K 31/0624 |
| | | | | 137/487.5 |
| 7,126,449 B2 | * | 10/2006 | Nickel | F16K 31/0655 |
| | | | | 251/129.15 |
| 7,249,749 B2 | * | 7/2007 | Niwa | F16K 31/0672 |
| | | | | 251/129.16 |

FOREIGN PATENT DOCUMENTS

| | | |
|---|---|---|
| DE | 699 21 116 T2 | 11/2005 |
| DE | 10 2006 044 364 A1 | 4/2007 |
| DE | 10 2007 047 127 A1 | 4/2009 |
| DE | 10 2011 077 350 A1 | 12/2012 |

\* cited by examiner

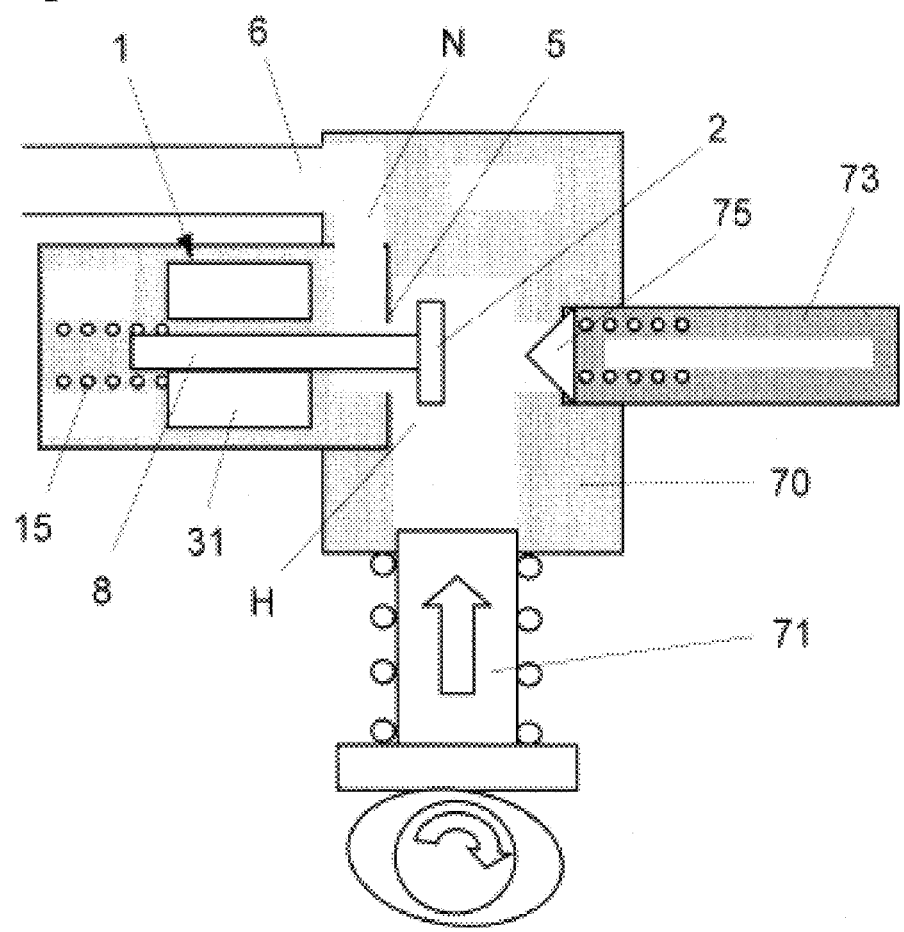

HIGH PRESSURE VALVE

CROSS-REFERENCE TO RELATED APPLICATION(S)

This application claims the benefit of German Patent Application No. 10 2013 100 440.7 filed Jan. 16, 2013, the contents of which are hereby incorporated by reference in its entirety

FIELD

The present invention relates to an electromagnetically actuable high-pressure valve.

BACKGROUND

The prior art discloses various electromagnetically actuable high-pressure valves having a valve seat which can be closed off by a sealing element and which is arranged between a low-pressure side and a high-pressure side of the valve, wherein the sealing element is arranged so as to be movable between an open position and a closed position, having a movably arranged armature, and having an electrically energizable coil which is designed and arranged so as to be suitable for acting on the armature. Valves of said type are used for example as high-pressure valves for regulating the rail pressure in common rail technology for gasoline direct injection. In this field of use, the high-pressure valve is arranged between a fuel supply line and a high-pressure pump which generates the high pressure, for example 280 bar, prevailing in the rail, and said high-pressure valve regulates the inflow of fuel into the high-pressure pump and the build-up of the pressure in the high-pressure pump, which pressure is then transferred into the rail.

A schematic diagram of the system known from the prior art, and the basic construction of the high-pressure valve used therein, are illustrated in FIG. 5.

FIG. 5 shows a high-pressure valve 1 with a low-pressure side N a high-pressure side H, wherein a valve seat 5 that can be closed off by a sealing element 2 is arranged between the low-pressure side N and the high-pressure side H. The low-pressure side N of the high-pressure valve 1 is connected to an inflow line 6 via which fuel delivered by a low-pressure pump is made available. The high-pressure side H of the high-pressure valve 1 is connected to the cylinder of a high-pressure pump 70, wherein the pressure of the fuel situated in the cylinder is built up, and said fuel is delivered in the direction of the rail 73, by a piston 71 when the valve seat 5 is closed. A check valve 75 is arranged between the rail 73 and the cylinder, which check valve prevents a flow of the high-pressure medium back from the rail 73 into the cylinder volume of the high-pressure pump 70.

According to the prior art, the sealing element 2 of the high-pressure valve 1 is connected via a plunger 8 to an armature and can be moved by electrical energization of a coil 31 which acts on the armature. The high-pressure valve 1 according to the prior art is in the form of a normally-open valve owing to a helical spring 15 arranged in the region of the armature, such that a pressure is built up by the high-pressure pump 70 only when the high-pressure valve 1 is closed, that is to say when the sealing element 2 sealingly closes the valve seat 5 such that the high-pressure medium is delivered not back in the direction of the inflow line 6 but rather, overpowering the check valve 75 which is closed by the high pressure in the rail 73 and by additional spring assistance, into the rail 73.

In the case of the high-pressure valves known from the prior art, it is considered to be disadvantageous that highly precise mounting of the armature, piston and sealing element is required to ensure an adequate sealing action of the high-pressure valve. Such highly precise mountings are cumbersome and thus make the manufacture of the valves more expensive.

It is the object of the present invention to further develop a high-pressure valve known from the prior art and to provide a high-pressure valve with improved characteristics.

SUMMARY

Said object is achieved by means of a high-pressure valve having the features of described below.

A high-pressure valve according to the invention is preferably electromagnetically actuated and has a valve seat which can be closed off by a plate-shaped sealing element and which is arranged in a valve chamber between a low-pressure side and a high-pressure side of the valve, wherein the sealing element is arranged so as to be movable between an open position and a closed position, a movably arranged armature, and an electrically energizable coil which is designed and arranged so as to be suitable for acting on the armature provided, wherein the sealing element and the armature are both arranged in the valve chamber. The armature is furthermore preferably in the form of a flat armature, which may in particular be decoupled from the sealing element.

In terms of the present invention, "plate-shaped sealing elements" should be understood in particular to mean sealing elements whose extent in a direction to a valve opening is larger than in the direction of the valve opening. Here, said sealing elements may however in particular be of set, partially perforated or other form.

By means of an arrangement according to the invention of armature and sealing element in the valve chamber, it is possible for highly precise mountings, such as are required in the prior art, to be dispensed with, such that the high-pressure valve can be manufactured at significantly lower cost.

The armature and the sealing element may in this case be mounted by means of compression springs such that a normally open valve is realized. Closing of the valve is achieved, when the coil is electrically energized, by means of a compression spring acting on the sealing element and by the medium pressure acting on the high-pressure side. In one refinement of the invention, the armature and the sealing element are formed in one piece as a valve plate.

In the present refinement, the armature and the sealing element are formed in one piece as a valve plate and are preferably arranged on the high-pressure side of the high-pressure valve. By virtue of the fact that the armature and the sealing element are formed in one piece as a valve plate, and the functionalities of armature and sealing element are combined, it is possible to dispense with components, and in particular, highly precise mountings such as are required in the prior art are eliminated. In the present refinement, the magnetic circuit for closing the high-pressure valve is led directly via the valve plate, and the latter is pulled toward the valve seat by the magnetic force generated by the coil. The valve plate preferably combines the armature and sealing element in one piece, and is preferably armature and sealing element in one piece, and is preferably manufactured entirely from a magnetic material.

To facilitate a throughflow of a medium conducted through the valve, for example of a fuel, and to reduce the forces exerted on the armature and/or on the valve plate by said throughflow and to reduce vortices generated by a flow passing around the armature and/or the valve plate, it is preferable for the armature and/or the valve plate to have at least one aperture, or more preferably bores. It is possible, for example, for two or four bores to be provided, which bores are preferably arranged equidistantly, and so as to be situated on a circular line, on the preferably circular armature and/or on the preferably circular valve plate. To ensure reliable closure of the high-pressure valve, it is preferably provided that, as seen in a plan view of the valve seat in the direction of a valve bore, the bores are arranged so as to be situated on a circular line and so as to surround the valve seat, that is to say the bores are configured such that the sealing element can, as before, reliably close off the valve seat in a sealing manner.

A non-magnetic, preferably annular seal is arranged between a coil chamber, in which the electrically energizable coil for actuating the valve is arranged, and a valve chamber through which the medium flows, which seal reliably seal off the coils with respect to medium. The seal is preferably in the form of a metal seal, such that a particularly stable arrangement is obtained.

To ensure a normally open position of the high-pressure valve, it is preferable for at least one spring to be provided which holds the valve plate in the open position when the coil is in the electrically deenergized state.

The spring may for example be in the form of a compression spring, in particular a helical spring, which is for example supported at one end on the valve plate and at the other end on the metal seal.

By virtue of the helical spring being supported at one side on the valve plate and at the other side on the metal seal, which may for example be of plate-shaped form, reliable mounting of the compression spring is achieved. Here, however, it is necessary for the seal which is arranged between the valve chamber and the coil chamber to be of not only pressure-tight but also mechanically stable design, such that the forces that act via the spring during switching processes can be absorbed. In an alternative refinement of the high-pressure valve according to the invention, the spring which generates a normally open position of the valve may also be in the form of a tension spring. A tension spring of said type may for example be realized in the form of at least one leaf spring. It is however preferable for at least two leaf springs to be provided which are arranged or mounted at one end on the valve plate and at the other end on a transition element that forms the transition to the high-pressure side. Leaf springs of said type may for example be in the form of strip-shaped spring elements which, as seen in a plan view in the direction of the valve bore, are arranged so as to run transversely with respect to a radius of the valve plate.

To make it possible for the high-pressure valve according to the invention to also be used in the field of gasoline direct injection or in fields involving other corrosive media, those components of the high-pressure valve which are in contact with the medium are manufactured from preferably hardened high-grade steel.

A particularly compact design of the high-pressure valve and an expedient configuration for sealing can be realized if a supply of medium from the low-pressure side takes place via a duct running within the coil, that is to say the medium is led through the electromagnet that is formed by the coil.

In order, in the case of said configuration, to be able to ensure that the magnetic field generated by the coil is conducted in an optimum manner, it is expedient if the duct that is provided for conducting medium is in the form of an inner pole for conducting the magnetic field. The medium is thus preferably supplied via a duct or a pipe composed of a magnetic material.

In order that the magnetic field is conducted in an optimum manner in the rear region of the high-pressure valve, that is to say at an end of the coil facing away from the high-pressure side, it is possible for a so-called closure plate to be provided there. Said closure plate is designed such that a magnetic field generated by the coil is diverted in the direction of the duct running in the interior of the coil, and thus a magnetic circuit is generated which is as short and loss-free as possible.

BRIEF DESCRIPTION OF THE FIGURE(S)

The present invention will be explained in detail below on the basis of two exemplary embodiments with reference to the appended figures.

Figure 2:
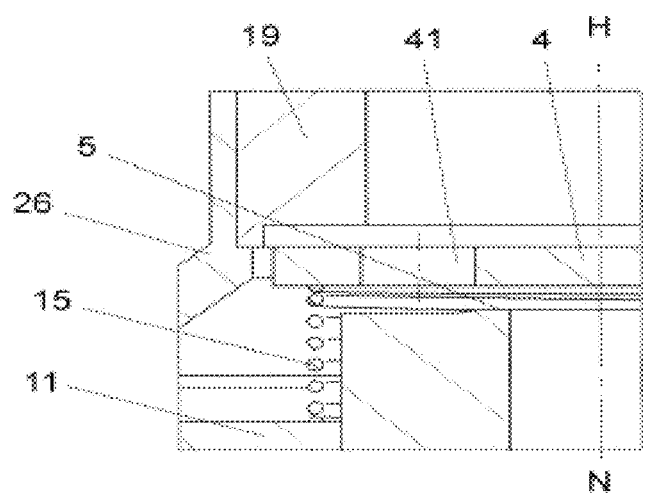
Figure 3:
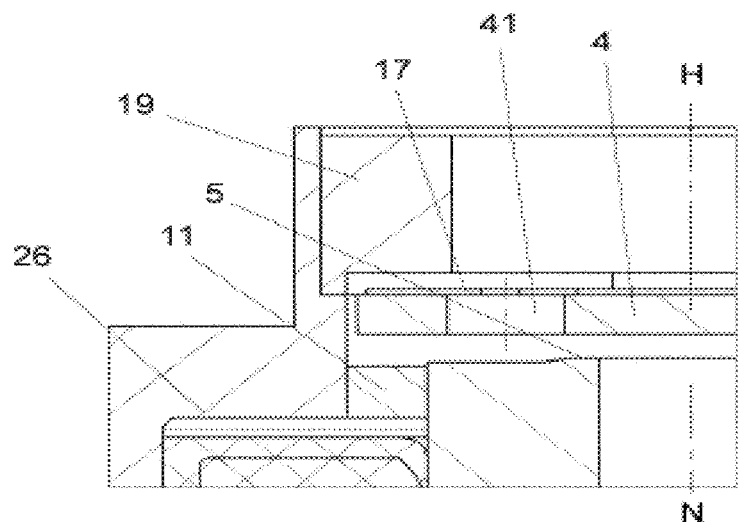
Figure 4:
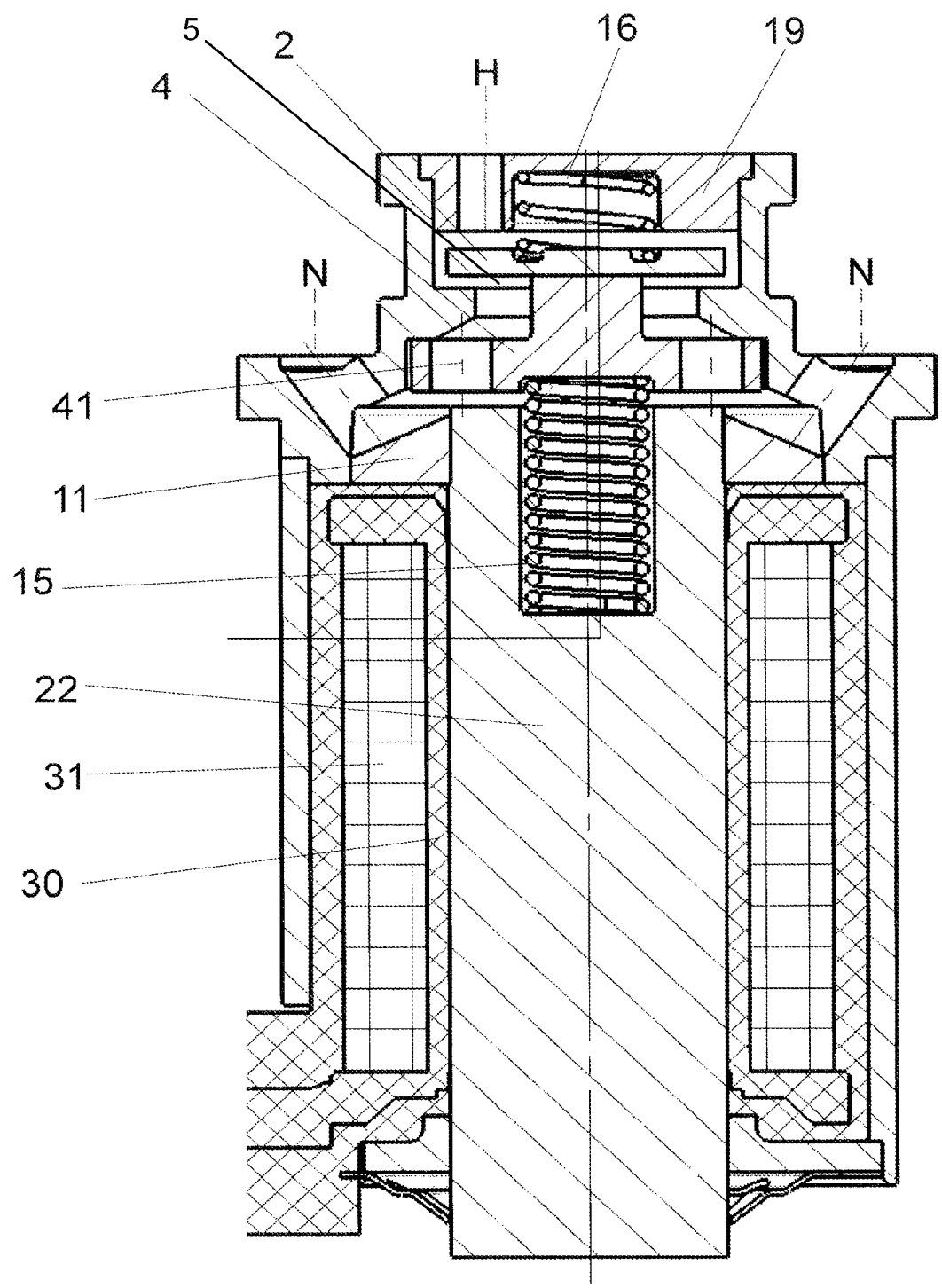

FIG. 1 shows a first exemplary embodiment of a high-pressure valve according to the invention, FIG. 2 shows an enlarged detail in the region of the valve seat from FIG. 1, FIG. 3 shows an enlarged detail of the region of the valve seat of a second exemplary embodiment, FIG. 4 shows a third exemplary embodiment of a high-pressure valve according to the invention, and FIG. 5 shows a diagrammatic sketch of a high-pressure valve known from the prior art, and the use thereof in a high-pressure pump in a common rail application (already discussed).

DETAILED DESCRIPTION OF THE FIGURE(S)

FIG. 1 shows a first exemplary embodiment of a high-pressure valve 1 according to the present invention.

The high-pressure valve 1 has, as a central element, a valve plate 4 which is suitably arranged so as to sealingly close off a valve seat 5 arranged below the valve plate 4. An actuation of the valve plate 4, which in the case of the illustrated high-pressure valve 1 combines a magnetically actuable armature and a sealing element in one element, is manufactured from a magnetically conductive material and can thus be realized by electrical energization of a coil 31 which is arranged on a coil carrier 30.

An electrical energization of the coil 31 and thus switching of the valve is realized via connection socket 28, which in the present exemplary embodiment is provided in a radially projecting manner on that end of the coil 31 which faces away from the high-pressure side H.

To conduct the magnetic flux within the high-pressure valve 1 and to conduct a medium from a low-pressure side N, a duct 21 which is arranged in an inner pole 22 extends from the low-pressure side N in the direction of the valve seat 5. The inner pole 22, in which the duct 21 is arranged, is in this case manufactured from a magnetically conductive material and is thus designed to be suitable for conducting the magnetic flux within the high-pressure valve 1. For the magnetic flux to be conducted in an optimum manner at an end, arranged so as to face away from the valve seat 5, of the coil 31, a closure plate 24 is provided which is arranged transversely with respect to the inner pole 22 and which thus simultaneously closes off a housing 26 of the high-pressure valve 1 at the rear side. At the front side, the coil 31 which is arranged in a coil chamber is sealed off by means of an encircling plate-shaped seal 11 which runs between the housing 26 and the inner pole 22 and which is composed of non-magnetic metallic material. The metal seal 11 thus divides an interior space of the housing 26 into the coil chamber and a valve chamber 9 through which medium flows. The valve plate 4, and a compression spring 15 which acts on the valve plate 4, are arranged in the valve chamber 9.

In the present exemplary embodiment, the compression spring 15 is in the form in the form of a helical spring which is supported at one end on the valve plate 4 and at the other end on the encircling metal seal 11.

To ensure an unhindered flow of medium through the valve chamber 9 in the direction of the high-pressure side H of the high-pressure valve 1, the sealing plate 4 has, in the present exemplary embodiment, four bores 41 which are arranged on a circular line so as to surround the valve seat 5. Here, the bores 41 are arranged such that the valve plate 4, which in the present case is of circular form, has in a central region a closed surface for sealingly closing off the valve seat 5.

A counterbearing for the valve plate in the open state is formed by a transition element 19 that forms a transition from the valve chamber 9 to the high-pressure region H in which, for example in the case of a common rail application, a high-pressure pump is arranged.

The high-pressure valve 1 illustrated here is in the form of a normally open valve, wherein the compression spring 15, which is in the form of a helical spring, is dimensioned such that, when the coil 31 is in an electrically deenergized state, the valve plate 4 is held in a position in which it is raised from the valve seat 5. In this position, it is possible, for example in the case of a common rail application, for medium to flow back out of the high-pressure pump to the low-pressure side N of the high-pressure valve 1. The pressure in the rail of the common rail system can be regulated in this way.

FIG. 2 shows an enlarged illustration of the valve seat 5 and of the valve plate 4 as illustrated in FIG. 1. In FIG. 2, it can be seen particularly clearly that the valve plate 4 is loaded in the direction of the high-pressure side H by means of a compression spring 15 in the form of a helical spring, such that the valve is in the form of a normally open valve. When the coil 31 is electrically deenergized, that is to say when no magnetic field acts on the valve plate 4, the pressure of the medium on the high-pressure side H thus cannot on its own cause the valve to close counter to the spring force of the compression spring 15, such that the medium displaced by the high-pressure pump flows through the bores 41 back to the low-pressure side N of the high-pressure valve 1. A pressure build-up within the high-pressure pump is thus not possible.

As shown in FIG. 2 and as already discussed above, the compression spring 15 is supported at one end on the valve plate 4 and at the other end on the encircling metal seal 11 which separates the valve chamber 9 from the coil chamber. The metal seal 11 that is shown is formed from a non-magnetic material and is designed to be stable enough to adequately absorb vibrations and shocks transmitted from the valve plate 4 via the compression spring 15. In the present exemplary embodiment, the transition element 19 is provided as a counterbearing for the valve plate 4. The transition element 19 has an abutment that is slightly spaced apart from the valve plate in an open position and that prevents the valve plate 4 from lifting under the action of forces, caused by medium flowing through the openings, in the direction of the high-pressure side H.

In a further embodiment, which corresponds in terms of its basic construction to the embodiment as per FIG. 1, the valve plate 4 is mounted on the transition element 19 by way of tension springs in the form of leaf springs 17. In this embodiment, a more compact construction than the embodiment in FIG. 2 is possible in the region of the valve chamber 9, because no additional installation space is required for accommodating the compression spring 15. In this embodiment, it is also possible for the metal seal 11 to be configured so as to be weaker with regard to mechanical influences, that is to say in the present exemplary embodiment not with regard to pressure influences, because it is not necessary for said metal seal to absorb transmitted vibrations or shocks.

In the present exemplary embodiment, two leaf springs 17 are provided which are arranged at one side on the circumference of the circular valve plate 4 and at the other side on the circumference of the likewise rotationally symmetrical transition element 19. For this purpose, the leaf springs are arranged so as to run along a secant of the transition element 19, which is of circular configuration as seen in plan view, such that a vertical movement of the valve plate 4 and a slight rotational movement are possible without elongation of the leaf springs 17.

In this context, it is pointed out that, as a result of a combination of the functions of the armature and of the sealing element in the valve plate 4, a considerable reduction of the number of moving components, and advantages with regard to the sealing measures to be implemented, are achieved in relation to high-pressure valves known from the prior art. It is pointed out in particular that no seals are required on the circumference of moving components, such that the valves described here can be designed to be virtually leakage-free.

Both the valve seat formed on the end of the duct 21 on the inner pole 22 and also the valve plate 4 are metallic and magnetically conductive components, such that sealing of the valve is realized by means of a metal-on-metal seal. The corresponding components should thus preferably be formed from hardened material.

FIG. 4 shows a further exemplary embodiment of a high-pressure valve 1, wherein by contrast to the high-pressure valves 1 illustrated in FIGS. 1 to 3, the high-pressure side H and the low-pressure side N are arranged at the same end of the valve. The valve thus has the advantage that a connection both to the high-pressure side H and also to the low-pressure side N can be produced by means of one flange connection.

For clarity, the connection socket 28 is not fully shown in the illustration.

Corresponding to the embodiment illustrated in FIG. 4, a supply from the low-pressure side N is realized by way of a radial supply of medium, which in the present example takes place via bores 32 provided on two opposite sides of the valve in the housing 26. The inner pole 22, which in the above exemplary embodiments was in the form of a supply duct 21, can thus be formed as a solid component and thus conduct a greater magnetic flux.

In order that the medium flowing in from the low-pressure side N is conducted in an optimum manner, the encircling metal seal 11 is of trapezoidal cross section and formed overall as an encircling seal ring which extends, and tapers conically, from the coil chamber in the direction of the valve chamber 9.

In the exemplary embodiment shown in FIG. 4, a flat armature is provided which is in the form of an armature plate 4 and which, in order to ensure a throughflow of medium, is provided with bores 41 which, as described above, are arranged for example so as to be situated on a circular line.

In the present exemplary embodiment, the armature plate 10 is of T-shaped form in cross section. The armature plate 4 is arranged such that a substantially disk-shaped section of the armature plate 4 is oriented in the direction of the coil chamber and has, in a central region, a substantially cylindrical projection which extends in the direction of the sealing element 2. In the present exemplary embodiment, the armature plate 4 is formed so as to be separate from a sealing element 2 which is provided in the direction of the high-pressure side H and which can sealingly close off a sealing seat 5 of encircling form. In the present exemplary embodiment, the sealing element 2 is of substantially plate-shaped form, though may also be of stepped form in order to bridge a distance between the armature plate 4 and the sealing element 2. In a central region, the sealing element 2 has, oriented in the direction of the high-pressure side H, a depression or an annular groove in which a bearing spring 16 for preloading the sealing element 2 in the direction of the sealing seat 5 is provided. The bearing spring 16 is mounted at the other end in a depression of the transition element 19, and thus secures the sealing element so as to prevent uncontrolled movements of the latter in the flow of medium.

The armature plate 4 is in turn preloaded in the direction of the high-pressure side H by means of a compression spring 15 which may for example be supported on the inner pole 22, such that a normally open valve is realized by means of corresponding coordination of the compression spring 15 and of the bearing spring 16. Likewise provided on the armature plate 4 is an annular groove or a depression for receiving the compression spring 15.

By means of decoupling of the armature plate 4 and sealing element 2, it is possible for magnetic forces in a tilting direction, which may be transmitted to the sealing element 2 in the case of a single-piece configuration of armature plate 4 and sealing element 2, to be avoided. In the present exemplary embodiment, when the coil 31 is electrically energized and the armature plate 4 is thus attracted in the direction of the inner pole 22, the sealing element 2 is closed exclusively by the spring force of the bearing spring 16 and by the pressure force exerted on the high-pressure side H of the valve as a result of a closure of the valve.

By virtue of the armature being formed as an armature plate or as a flat armature 4 and the sealing element 2 being formed likewise as a plate-shaped sealing element 2, the complex, highly precise mountings in the prior art can likewise be avoided, and in this way cheaper manufacture of the high-pressure valve 1 can be achieved.

LIST OF REFERENCE SIGNS

1 High-pressure valve
2 Sealing element
3 Electromagnet
4 Valve plate
5 Valve seat
6 Inflow line
7 Valve bore
8 Armature with plunger
9 Valve chamber
10 Armature plate/armature
11 Metal seal/seal
13 Spring
15 Compression spring
16 Bearing spring
17 Leaf spring
19 Transition element
21 Duct
22 Inner pole
24 Closure plate
26 Housing
28 Terminal contact
30 Coil carrier
31 Coil
32 Bore
70 High-pressure pump
71 Piston
73 Rail
75 Check valve
H High-pressure side
N Low-pressure side

The invention claimed is:

1. An electromagnetically actuable high-pressure valving apparatus suitable for the field of gasoline direct injection or other fields using corrosive media, comprising:
a one piece high-pressure valve with a high pressure side of about 280 bar;
a valve seat which is arranged in a valve chamber of the valve and which can be closed off by a plate-shaped sealing element whose extent perpendicular to a direction of a valve opening is larger than in a direction of the valve opening and which is arranged between a low-pressure side (N) and a high-pressure side of the valve, wherein the plate-shaped sealing element is arranged so as to be movable between an open position and a closed position, having a movably arranged armature, and having an electrically energizable coil arranged so as to be suitable for acting on the armature, wherein the armature and the plate-shaped sealing element are arranged in the valve chamber, wherein the valve is in an open state when the energizable coil is unenergized and in a closed state when energized, wherein the armature is formed so as to be separate from the sealing element and wherein high-pressure valve components which are in contact with the corrosive media are manufactured from at least one of high-grade steel and hardened high grade steel, and wherein the armature is of a T-shaped form in cross section.

2. The high-pressure valving apparatus according to claim 1, wherein the armature is in the form of a flat armature.

3. The high-pressure valving apparatus according to claim 1, wherein the armature has at least one aperture, or bores, for a throughflow of medium.

4. The high-pressure valving apparatus according to claim 3, wherein, as seen in a plan view of the valve seat in the direction of a valve bore, the bores are arranged so as to be situated on a circular line and so as to surround the valve seat.

5. The high-pressure valving apparatus according to claim 1, wherein a non-magnetic seal which is of annular form, or a metal seal, is arranged between the energizable coil and the valve chamber.

6. The high-pressure valving apparatus according to claim 1, wherein at least one spring is provided which holds the plate-shaped sealing element in the open position when the energizable coil is in an electrically deenergized state.

7. The high-pressure valving apparatus according to claim 6, wherein the at least one spring is in the form of a compression spring, in particular a helical spring.

8. The high-pressure valving apparatus according to claim 6, wherein the at least one spring is in the form of a tension spring.

9. The high-pressure valving apparatus according to claim 8, wherein the tension spring is in the form of at least one leaf spring.

10. The high-pressure valving apparatus according to claim 1, wherein a supply of medium from the low-pressure side N takes place via a duct running within the energizable coil.

11. The high-pressure valving apparatus according to claim 10, wherein the duct is formed as an inner pole for conducting a magnetic field.

12. The high-pressure valving apparatus according to claim 1, wherein a closure plate for conducting a magnetic field is provided on an end of the energizable coil facing away from the high-pressure side, which faces away from the high-pressure side H, of the energizable coil.

* * * * *